Aug. 2, 1966 L. THEVENAZ 3,264,003

AUTOMATIC RECORD CHANGER

Filed July 15, 1963 4 Sheets-Sheet 1

INVENTOR

LOUIS THEVENAZ

BY Irvin S. Thompson

ATTORNEY

Aug. 2, 1966 L. THEVENAZ 3,264,003

AUTOMATIC RECORD CHANGER

Filed July 15, 1963 4 Sheets-Sheet 2

INVENTOR
LOUIS THEVENAZ
BY Irvin S. Thompson
ATTORNEY

INVENTOR

LOUIS THEVENAZ

BY Irvin S. Thompson

ATTORNEY

AUTOMATIC RECORD CHANGER

Filed July 15, 1963 4 Sheets-Sheet 4

INVENTOR

LOUIS THEVENAZ

BY Irvin S. Thompson

ATTORNEY 3,264,003

AUTOMATIC RECORD CHANGER

Louis Thevenaz, Las Rasses, Vaud, Switzerland, assignor to Thorens S.A. Vaud, Switzerland, a corporation of Switzerland Filed July 15, 1963, Ser. No. 295,051
Claims priority, application Switzerland, Aug. 24, 1962, 10,078/62
11 Claims. (Cl. 274—10)

Automatic record changers in most use at the present time are those of the type comprising a central record-carrier rod or spindle prolonging the central axis of the turntable. This central spindle has a supporting surface on which rests the pile of records in reserve or records to be played, this spindle passing through the records of the said pile by their central hole.

During the operation of the automatic record changer each record of this reserve pile is successively released from the supporting surface and slips along the spindle to its playing position in which it rests on the turntable or on the records already played which are stacked on the turntable.

In this type of automatic record changer only the first record is played under the best or even normal conditions. In fact, this first record is played under conditions which approach those met with in turntables of the professional or semi-professional type not possessing automatic record changer devices.

On the other hand the following records successively stack themselves one upon the other on the turntable. The playing surface or plane in which is to be found the needle of the cartridge carried by the arm on the pick-up, rises more and more above the turntable and the position of this needle relative to the record played becomes rapidly unfavorable due to the always more accentuated slant of the pick-up arm.

Moreover, the records are never perfectly plane and the errors in planeness of the records stacked on the turntable combine and may, in the most unfavorable case, add up so that the effective playing surface may present much more considerable errors in planeness than that of the record which is being played.

Further, the records stacked on the turntable are in contact one with the other only at certain points due to their imperfect planeness and since the material from which the records are produced do not possess a high friction coefficient, it very frequently happens that these records slide jerkily one with respect to the other, thus causing a whining effect.

For all these reasons this type of automatic record changer is not satisfactory for exacting music amateurs and the latter prefer turntables without a record changer mechanism in order to obtain better hearing.

In order to obviate these disadvantages certain manufacturers have tried to produce automatic record changers in which the records to be played are successively brought from a storage position to a playing position and then removed from this playing position to a played record stocking position. However these changers have not met with a favorable reception because they require either prohibitive space or a mechanism of excessive complexity.

The present invention has for object an automatic record changer tending to obviate the above mentioned disadvantages in which each record to be played is brought from a storage position to a playing position and then, the hearing of the said record being ended, moved away from this playing position to a played record stocking position. This automatic record changer moreover comprises, as in the case of existing automatic record changers, a turntable driven to rotate by a motor, a pick-up arm and a cycle control mechanism actuated by the said motor and controlling all the movements of the various members of the changer and comprises further a transfer device actuated by the cycle control mechanism and which successively brings each record from a storage pile carried by a first supporting surface, disposed outside the periphery of the turntable, on to the said turntable and then, the hearing being ended, deposits the record on a stocking pile carried by a second supporting surface, also located outside the periphery of the turntable.

The accompanying drawing shows diagrammatically and by way of example one embodiment of an automatic record changer according to the invention.

FIG. 4 shows in elevation, partially and on a larger scale, the storage pile of records to be played, the supporting surface for this storage pile as well as the head of the server arm at the moment when the latter is about to seize a record having a central hole of 0.275 in.

FIG. 5 shows in elevation, partially and on a larger scale, the storage pile of records to be played, the supporting surface for this storage pile as well as the head of the server arm at the moment when the latter has raised a record from the storage pile, having a central hole of 1.26 in.

Figure 1:
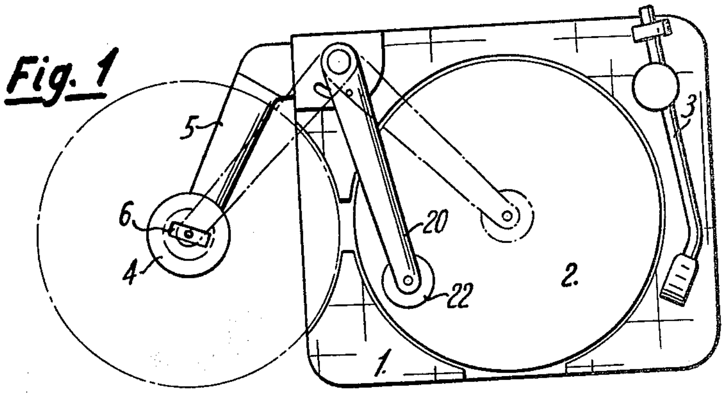
FIG. 1 is a view from above of the automatic record changer.

The automatic record changer shown comprises a base plate 1 constituting the frame of the automatic record changer on which pivots a turntable 2 adapted to be rotated by means of an electric motor (not shown) by means of a driving device of known type (not shown). the case of known record changers, a pick-up arm 3 pivoting relative to the base plate 1 along a horizontal axis as well as along a vertical axis. This pick-up arm 3 is for example of the type described in U.S. Patent No. 3,129,006.

The movements both vertical and angular of this pick-up arm 3 are controlled in known manner by the cycle control mechanism of the automatic record changer.

This automatic record changer further comprises a first supporting surface 4, disposed in a plane parallel to the plane of the turntable 2, carried by an arm 5 rigidly connected to the base plate 1. This first supporting surface 4 is placed outside the periphery of the turntable 2 in such a way that when a record of the largest diameter is placed on the supporting surface 4 the edge of the latter is situated on a cylindrical surface with an axis perpendicular to the supporting surface having no intersection with a cylindrical surface with an axis perpendicular to the turntable 2 and passing by the edge of a record of largest diameter placed on the said turntable 2. In practice, the supporting surface 4 is disposed in such a way that the generating lines the nearest to these two cylindrical surfaces with parallel axes are distant one from the other by a few millimeters. In this way there is ensured a minimum space for the automatic record changer compatible with the satisfactory operation of the latter.

Figure 3:
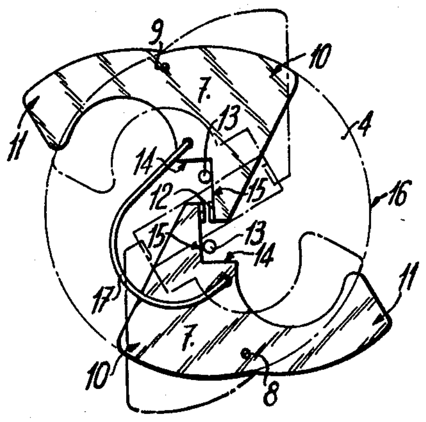
FIG. 3 shows, seen in plan, a detail on a larger scale of the supporting surface for the storage pile of records to be played.

This first supporting surface 4 is situated in a higher horizontal plane than that defined by the surface of the turntable 2 and is provided with a centering device 6 for the records of the storage pile to be carried by the said supporting surface 4. This centering device is shown in detail in FIG. 3 of the accompanying drawing.

This centering device comprises two rocking elements 7 pivoted to the supporting surface 4 at two points 8, 9 diametrally opposed relative to the centre of the said supporting surface 4. Each of these rocking elements 7 comprises two actuating ramps 10, 11 as well as a centering finger 12. Stops 13 integral with the supporting surface 4 are provided to limit, by entering into contact with corresponding faces 14, 15 made on the rocking elements 7, the angular movements of the said elements 7. For each of the farthest angular positions which these rocking elements 7 may reach, one of their actuating ramps 10, 11 merges into the periphery 16 of the supporting surface 4 while the other protrudes out of the said periphery 16. The rocking elements 7 are also connected one to the other by means of a wire spring 17 tending to maintain the said rocking elements 7 either in one or the other of their farthest angular positions. These farthest postions of the rocking elements 7 are such that for one of them the centering fingers 12 are sufficiently close together to be inscribed in a circle of a diameter corresponding at a maximum to the diameter of a central hole for records of 0.275 in. while in their other farthest position these centering fingers 12 are situated on a circumference of a diameter corresponding to a central hole for records of 1.26 in.

Figures 4, 5:
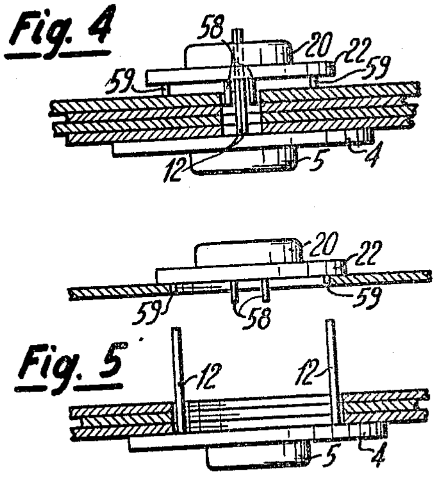
Figure 7:
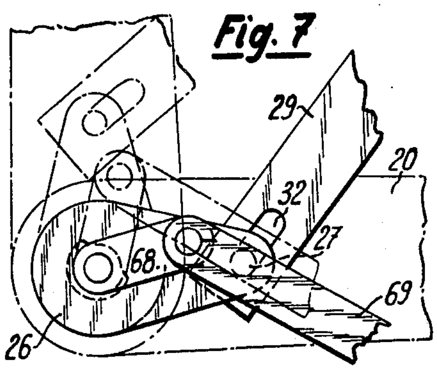
FIG. 7 is a view from below of FIG. 6.
Figure 6:
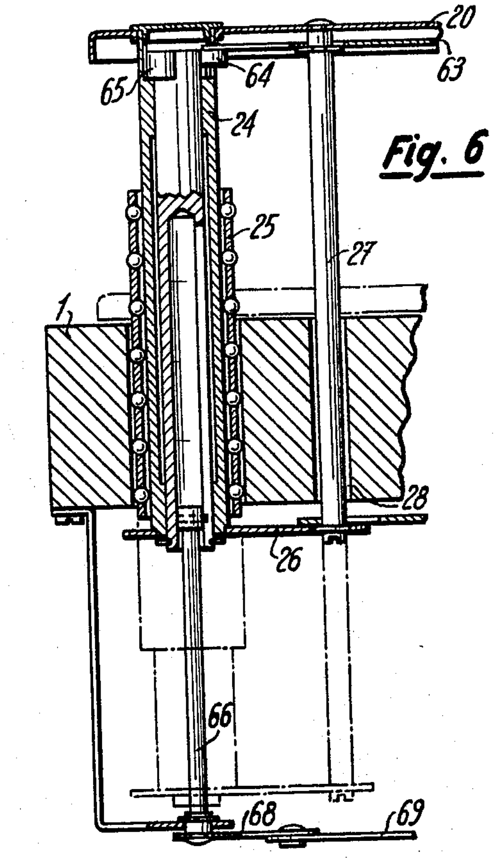
FIG. 6 is a partial view in section and on a larger scale of the server arm, its mounting on the frame of the automatic record changer and a part of its actuating device.
Figure 8:
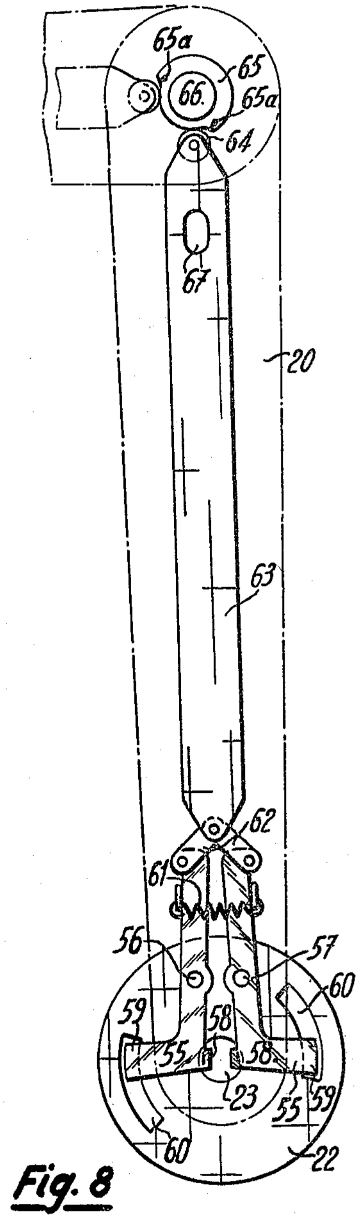
FIG. 8 is a view from above on a larger scale showing the device for seizing a record from the server arm and a part of its actuating mechanism.
Figure 9:
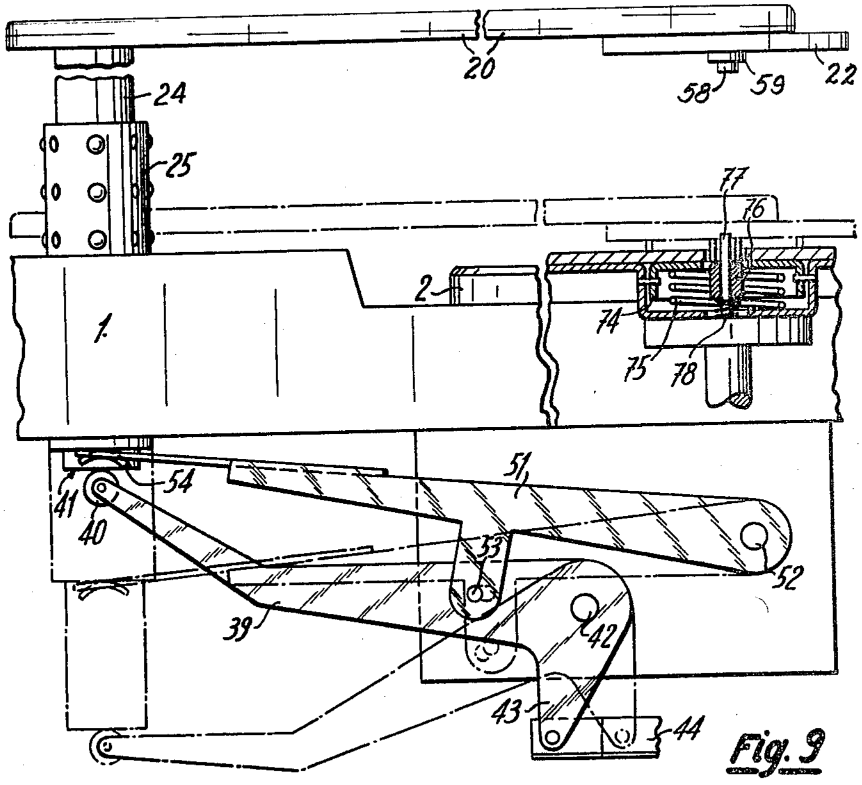
FIG. 9 is a view in partial elevation and on a larger scale, certain parts being withdrawn and others seen in section, of the automatic record changer.

This centering device which one moves from one of its farthest positions to the other by exerting pressure towards the centre of the supporting surface 4 on the ramps 10, 11 protruding out of the perphery 16 of the supporting surface 4, permits of maintaining records in storage position centered on the supporting surface 4 having both a central hole of 0.275 in. (FIG. 4) and of 1.26 in. (FIG. 5).

The height of the centering fingers 12 determines the number of records of the storage pile. In fact, all the records of the storage pile must be engaged on these centering fingers 12 to ensure a satisfactory operation of the automatic record changer.

The automatic record changer is also provided with a second supporting surface 18 carried by an arm 19 similar to the arm 5. This second supporting surface 18 is also situated outside the turntable 2 and is aligned vertically on the supporting surface 4. This second supporting surface 18 is situated in a horizontal plane lower than the turntable 2. This second supporting surface 18 is adapted to receive the pile of records already played.

Finally, the automatic record changer, object of the invention, further comprises a transfer device actuated by means of the cycle control mechanism of the automatic record changer. This transfer device comprises a server arm 20, movable angularly and linearly along a vertical axis relative to the base plate 1, actuating mechanisms for the said server arm 20 for its angular and vertical movements as well as a record gripping device.

Before describing the transfer device in detail it is necessary to describe briefly the cycle control mechanism of the changer. This cycle control mechanism comprises a cam shaft 21 driven to rotate by means of a train of gears or any other transmission device (not shown) by the motor (not shown) of the automatic record changer. This cycle control mechanism further comprises a number of cams equal to the various movements which must be controlled by said mechanism.

The server arm 20 disposed in a horizontal plane is provided at its free end with a small plate 22 through which is drilled a central hole 23 and pivots on the base plate 1 of the automatic record changer in such a way that for the two farthest angular positions which it may assume, the said hole 23 is centered either on the turntable 2 or on the supporting surface 4. Adjustable stops 30 permit of adjusting precisely each of the farthest angular positions of the server arm 20. This server arm 20 is integral with a hollow shaft 24 at its other end which, itself, pivots on the base plate 1 along a vertical axis by means of a ball bearing sleeve 25. The hollow shaft 24 is thus movable angularly and linearly on a vertical axis relative to the said base plate 1. This hollow shaft 24 passes clean through the base plate 1 as well as the ball bearing sleeve 25 and comprises at its lower end a small plate 26. An actuating member 27 constituted by a rod is secured at one of its ends to the said small plate 26 and at its other end to the server arm 20. This rod 27 traverses the base plate 1 through a slot 28 having the general shape of an arc of a circle centered on the pivot axis of the arm 20 on the base plate 1.

The actuating mechanism of the said server arm 20 in its angular movements comprises a first lever 29 pivoting at one of its ends on the base plate 1 at 31 and having at its other end an orifice 32 in which the rod 27 is engaged. This first lever 29 is connected by means of a connecting rod 34 to a second lever 33 one end of which pivots on the base plate at 35, while its other end is subjected to an elastic action 36. This second lever 33 carries a finger 37 cooperating with a cam 38 carried by the cam shaft 21. The connecting rod 34 comprises either a member for adjusting its length or an elastic device (not shown) so that the left of the cam 38 does not depend on the adjustment of the stops 30.

The actuating mechanism of the server arm 20 in its vertical movements comprises an actuating lever 39 the free end of which is provided with a roller 40 in contact with the lower front face 41 of the hollow shaft 24. This actuating lever 39 pivots at 42 on the base plate 1 and comprises a small arm 43, connected by means of a variable length connecting rod 44 to a lever 45 adjacent one of its ends, which is guided in a guide 46 integral with the base plate 1 and subjected to an elastic action 47. The other end of this lever 45 pivots on the base plate at 48. This lever further carries a finger 49 cooperating with a cam 50 carried by the cam shaft 21. This mechanism further comprises a lever 51 for holding the ball bearing sleeve 25 pivoted at 52 on the base plate 1 and is connected at 53 to the actuating lever 39. The free end of this holding lever 51 comprises a supporting member 54 on which rests the ball bearing sleeve 25 by virtue of its own weight. This lever 51 is arranged in such a way that its supporting member 54 is driven to effect movements of a lesser extent, by about one half, than the movements of the roller 40.

The record gripping device comprises a gripper formed of two jaws 55 pivoting at 56, 57 respectively on the small plate 22 carried by the server arm 20. Each jaw 55 comprises two noses 58, 59 passing through the small plate 22 by the central hole 23 and one of the grooves 60 respectively and adapted to enter into contact with the edge of the central hole of a record of 0.275 in. and 1.26 in. under the action of a spring 61 tending to separate the noses 58, 59 carried by different jaws. The noses 59 are shorter than the noses 58.

The corresponding bringing together of the noses 58, 59 is controlled by a mechanism comprising small connecting rods 62 connecting the free end of the jaws 55 to one end of a push-rod 63 the other end of which carries a roller 64. This roller 64 cooperates with a cam 65 carried by the upper end of a shaft 66 disposed concentrically inside the hollow shaft 24 and pivoting inside the latter. This shaft 66 is formed of two parts sliding axially one relative to the other but of which the relative angular positions are fixed. It is in fact necessary that this shaft be extensible axially so as to follow the vertical movements of the server arm 20. This cam 65 comprises two lifts 65*a* angularly offset to an extent equal to or slightly greater than the angle separating the farthest angular positions of the server arm 20 so that the operation of the gripper may be actuated in one or the other of the said farthest angular positions of the arm 20. The push-rod 63 comprises, adjacent to the roller 64, an orifice 67 through which is engaged the rod 27 so as to fix the position of the said push-rod relative to the arm 20. The lower end of the shaft 66 carries an eccentric 68 connected by a connecting rod 69 to a lever 70. This lever 70 pivots at 48 on the base plate 1, is guided at its other end by the guide 46 and is subjected to an elastic action 71. This lever 70 carries a finger 72 cooperating with a cam 73 carried by the cam shaft 21.

In order that a record placed on the turntable 2 may be gripped and raised by the record gripping device the turntable is provided with a retractable centering device. This centering device comprises a large retractable centre of a diameter corresponding to the central hole of 1.26 in. of a record similar to those in general use. This large retractable centre is formed by a centre 74 concentric with the axis of the turntable 2 subjected to the action of a spring 75 tending to maintain the latter above the plane of the turntable 2. This centre 74 is further provided with a bayonet coupling permitting to secure it in a retracted position in which its upper surface is on a level with the upper surface of the turntable 2.

This centering device further comprises a small retractable centre comprising a small centre 76 of a diameter corresponding to the central hole of 0.275 in. of a record coaxial with the pivot axis of the turntable 2 slidably mounted on a lug 77. This small centre is held in its raised position, projecting out of the upper surface of the turntable, by a spring 78.

The automatic record changer described is further provided with a record diameter selecting device (not shown) controlled by the cycle control mechanism of the changer and causing the vertical and horizontal movements of the arm of the pick-up necessary for the correct positioning of the latter.

Various devices for selecting the diameter of a record to be played are known and one of the existing ones, for example the one object of said Patent No. 3,129,006, may be used on the automatic record changer, object of the invention.

The movements of the pick-up arm are controlled by means of a device for selecting the diameter of the records to be played by means of one or several cams carried by the cam shaft 21.

The automatic record changer further comprises, as in the case of existing changers, manual control members permitting the choice of the speed of rotation of the turntable as well as the accurate adjustment of the latter, the starting and the stopping of the changer as well as an automatic stopping device when all the stored records have been played.

The operation of the automatic record changer described is as follows:

At the stop or rest position of the automatic record changer the turntable as well as the first and second supporting surfaces do not carry any record, the pick-up arm is located outside the periphery of the turntable, and the server arm 20 is in lowered position and centred on the axis of the supporting surfaces 4, 18.

In order to play records the user proceeds with the following operations:

(1) He places on the supporting surface 4 a storage pile comprising records to be played having a central hole of 0.275 in. or of 1.26 in. after having adjusted the centering device 6 in the corresponding manner. The records of this storage pile are thus automatically centred by means of the centering fingers 12 which traverse them through their central hole.

(2) He starts up the changer which has for result to bring about, by means of the cycle control mechanism of the changer, the following necessary operations:

(a) The rotation of the turntable.

Figure 2:
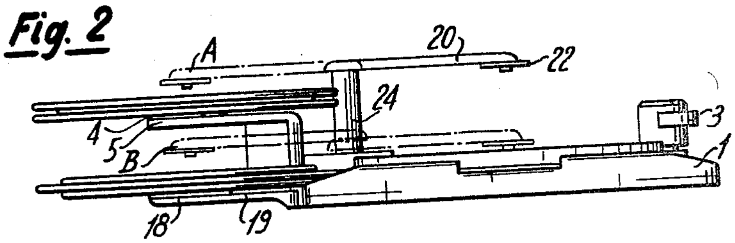
FIG. 2 is a view in elevation of the automatic record changer.

(b) The passage, by successive translation and rotation, of the server arm 20 from its rest position to a raised position, centred on the axis of the first supporting surface 4 but above the storage pile carried by the said supporting surface 4 (position A FIG. 2).

(c) The actuating of the jaws 55 in order to bring together the corresponding noses 58, 59.

(d) The lowering of the server arm 20 until it abuts against the top record of the storage pile.

When the storage pile comprises records having a small central hole (0.275 in.) the noses 58 engage in this hole and the arm 20 abuts, by means of the noses 59, against the upper surface of the top record of the storage pile. In this position the centering fingers 12 are engaged in the central hole 23 of the head of the arm 20.

When the records of the storage pile have a large central hole (1.26 in.) the noses 58 and 59 engage in this central hole and the arm 20 rests, by means of the lower surface of the small plate 22, on the upper surface of the top record of the said storage pile. In this position the centering fingers 12 are engaged in the slots 60 passing next to the noses 59.

(e) The release of the jaws 55 which separates the corresponding noses 58, 59 under the action of the spring 61.

According to the diameter of the central hole of the records of the storage pile the noses 58 or 59 are applied against the peripheral surface of the central hole of the top record of the storage pile.

(f) The record thus gripped by the record gripping device is then brought, by translation and rotation of the arm 20, to a position centred on the turntable and at a short distance above the said table.

(g) The selection of the diameter of the record carried by the arm 20 by means of the pick-up arm.

(h) The operation of the jaws in order to release the record carried by the arm 20 which falls freely on the turntable 2.

(i) The setting of the pick-up arm on the record and the hearing of the latter and then the return of the pick-up arm to its rest position after the end of the hearing of the record.

(j) The operation of the jaws 55.

(k) The lowering of the arm 20 on to the record which has been played. During this lowering the small and/or large centre (74, 76), according to the diameter of the central hole of the played record, are retracted against the action of their springs 78, 75.

(l) The release of the jaws 55 and therefore the gripping of the record by the noses 58 or 59 according to the diameter of its central hole.

(m) The movement of the played record, by translation and rotation of the arm 20, to a position centred above the second supporting surface 18 (position B FIG. 2).

(n) The operation of the jaws causing the release of the record carried by the arm 20 and its free fall on to the supporting surface 18, or on the stocking pile of the played records carried by the said supporting surface 18.

This cycle is repeated a number of times equal to the number of records of the storage pile. Then, when there are no more records on the supporting surface 4, the arm comes empty, that is to say without a record, in the position of selection of the diameter of the record to be played; the travel of the pick-up arm during the diameter selecting operation is maximum and causes the stopping in known manner of the automatic record changer.

Figure 13:
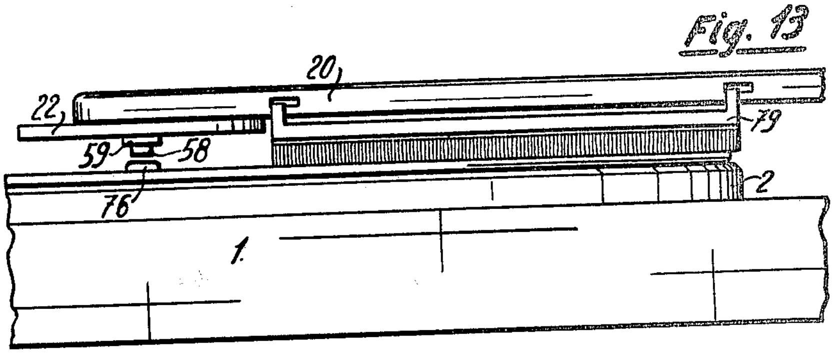
FIG. 13 shows partially and on a large scale a server arm provided with a brush for freeing the record from dust.

It is to be noted that during the hearing of a record, the arm 20 is disposed at a short distance above the turntable and approximately radially relative to the latter and it is easy to provide a very soft brush 79 carried by this arm and resting on the surface of the record being played (FIG. 13). This brush 79 is hinged on a horizontal axis relative to the server arm 20 to permit the lowering of this arm 20 in order to grip the record after its hearing. This brush may be removably fixed to the arm to permit of cleaning the same. This allows an efficient freeing from dust of the record being played which is very important for reducing the wear of the records. Such freeing from dust is practically necessary when use is made of pick-up cartridges exerting a very low pressure.

The automatic record changer decribed offers the following principal advantages:

(1) The turntable never carries more than one record which permits of obtaining hearing qualities which approach those of professional turntable.

(2) The space taken up by the changer is very reduced due to the special disposition of the storage and of the already played piles of records.

(3) It is always possible during the hearing of a record to add to, remove or modify the order of the records of the storage pile which is very much to be appreciated.

One embodiment of the changer according to the invention has been described and illustrated by way of example but it is obvious that numerous equivalent mechanical solutions may be foreseen in order to produce the same result.

Figure 10:
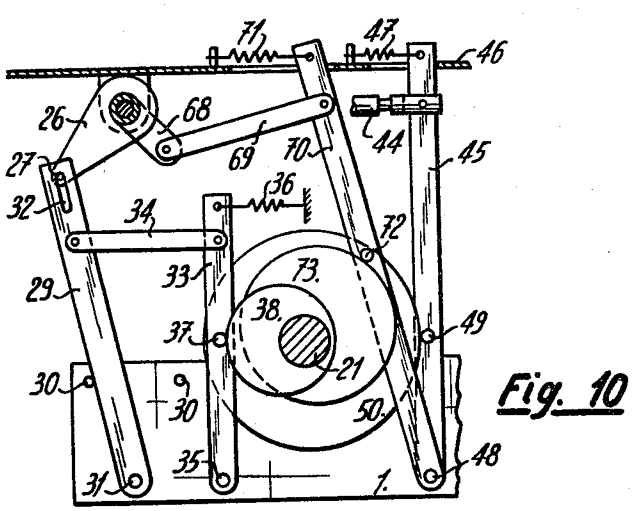
FIG. 10 is a partial diagrammatic view of the cycle control mechanism for the automatic record changer and of the transfer device.

It is further to be noted that the cams 38, 50 and 73 carried by the cam shaft 21 are shown diagrammatically in FIG. 10 but their form as shown does not correspond to the cycle described.

According to the shape of the noses 58 of the record gripping device, one runs the risk of gripping two thin records at the same time or of not being able to seize safely a thick record. In order to obviate these disadvantages, a special form of this arm has been worked out (FIGS. 11 and 12) permitting of guaranteeing the gripping of any thick or thin record.

In this modified form (FIGS. 11, 12) the noses 58 are asymmetrical.

The nose **58*a* is longer than the nose 58*b***. It is formed of a part having a cylindrical surface which ends in a projecting part of a larger diameter formed of two conical surfaces *c* and *d*. The edge separating these two surfaces is situated, relative to the end of the noses 59, at a level corresponding to a thickness slightly greater than that of the thickest record to be played.

The nose **58*b*** is also formed of a cylindrical part terminated by a cone segment *e*. This cone segment *e* is situated at a level such that, relative to the end of the noses 59, it just projects below a record of minimum thickness.

The gripping of a record is thus carried out in the following manner: The record to be seized is gripped between the noses **58*a* and 58*b***, the lower edge of the cylindrical hole being firmly held by the conical part *c*. In the case of two superposed records of minimum thickness (FIG. 12), only the first record is gripped by the cylindrical parts of the noses **58*a* and 58*b***. The second record is moved to a slight extent laterally by the part *c, d* of the nose **58*a*, but, finding no support on the part of nose 58*b*, it is not raised when the arm 20** is lifted.

Figure 11:
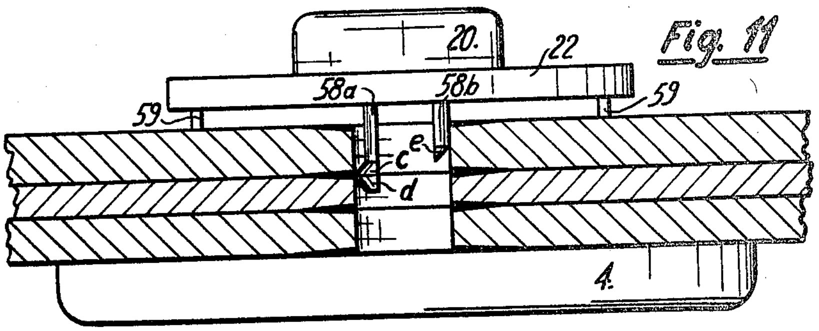
FIG. 11 shows partially and on a larger scale an alternative form of the head of the server arm at the moment when the latter seizes a thick record on the storage pile.
Figure 12:
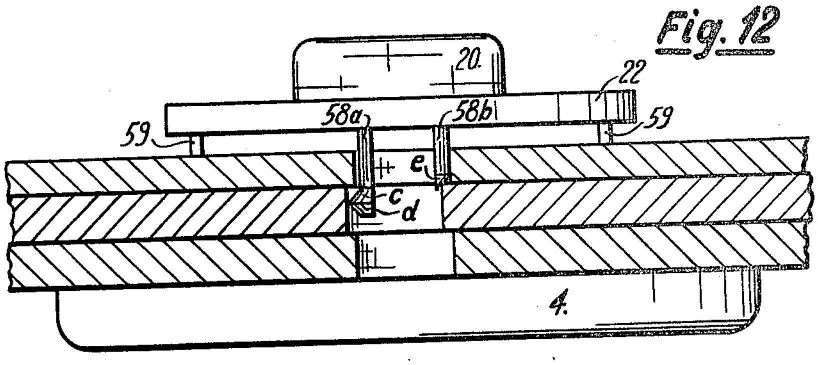
FIG. 12 shows partially and on a larger scale the head of the server arm according to FIG. 11 at the moment when the latter seizes a thin record on the storage pile.

In the case of the gripping of a thick record the conical part *c, d* of the nose **58*a* is situated approximately at the height of the lower surface of the thick record. This record is gripped over practically its whole thickness by the noses 58*a* and 58*b*** (FIG. 11).

I claim:

1. In an automatic record changer, in which each record to be played is brought from a storage position to a playing position then, after the hearing of the record has ended, moved from its playing position to a stocking position for played records, including a frame, a motor, a turntable drivingly connected to said motor for its driving in rotation, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device bringing each record of said storage pile carried by said first supporting surface on to the said turntable, then after the hearing, transferring the said record on the stocking pile carried by said second supporting surface.

2. In an automatic record changer, in which each record to be played is brought from a storage position to a playing position then, after the hearing of the record has ended, moved from its playing position to a stocking position for played records, including a frame, a motor, a turntable drivingly connected to said motor for its driving in rotation, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed no the smaller diameter having a greater length than the noses of the said other pair of noses, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device bringing each record of said storage pile carried by said first supporting surface on to the said turntable, then after the hearing, transferring the said record on the stocking pile carried by said second supporting surface.

3. In an automatic record changer, in which each record to be played is brought from a storage position to a playing position then, after the hearing of the record has ended, moved from its playing position to a stocking position for played records, including a frame, a motor, a turntable drivingly connected to said motor for its driving in rotation, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed on the smaller diameter showing different length but being both longer than the noses of the said other pair of noses, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device bringing each record of said storage pile carried by said first supporting surface on to the said turntable, then after the hearing, transferring the said record on the stocking pile carried by said second supporting surface.

4. In an automatic record changer, in which each record to be played is brought from a storage position to a playing position then, after the hearing of the record has ended, moved from its playing position to a stocking position for played records, including a frame, a motor, a turntable drivingly connected to said motor, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed on the smaller diameter having a greater length than the noses of the said other pair of noses, a short nose of said inner pair of noses having a cylindrical part and a tapering end, a long nose of said inner pair of noses having also a cylindrical part and presenting at its end an edge situated on a larger diameter than that of the said cylindrical part, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device bringing each record of said storage pile carried by said first supporting surface on to the said turntable, then after the hearing, transferring the said record on the stocking pile carried by said second supporting surface.

5. In an automatic record changer, in which each record to be played is brought from a storage position to a playing position then, after the hearing of the record has ended, moved from its playing position to a stocking position for played records, including a frame, a motor, a turntable drivingly connected to said motor, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed on the smaller diameter having a greater length than the noses of the said other pair of noses, actuating means of said gripping device, said actuating means being unaffected by the angular and linear displacements of said server arm, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device bringing each record of said storage pile carried by said first supporting surface on to the said turntable, then after the hearing, transferring the said record on the stocking pile carried by said second supporting surface.

6. In an automatic record changer, in which each record to be played is brought from a storage position to a playing position then, after the hearing of the record has ended, moved from its playing position to a stocking position for played records, including a frame, a motor, a turntable drivingly connected to said motor, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and the large central holes of records, the said pair of noses disposed on the smaller diameter having a greater length than the noses of the said other pair of noses actuating means of said gripping device said actuating means being unaffected by the angularly and linear displacements of said server arm, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device bringing each record of said storage pile carried by said first supporting surface on to the said turntable, then after the hearing, transferring the said record on the stocking pile carried by said second supporting surface, a centering device carried by the turntable comprising a retractable centering device having a large center movable against the action of a spring, retaining means enabling to secure said large center either in its raised or in its retracted position, as well as a small retractable center, and a spring tending to maintain said small center in its raised position.

7. In an automatic record changer, in which each record to be played is brought from a storage position to a playing position, then, after the hearing of the record has ended, moved from its playing position to a stocking position for played records, including a frame, a motor, a turntable drivingly connected to said motor, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed on the smaller diameter having a greater length than the noses of said other pair of noses, actuating means of said gripping device said actuating means being unaffected by the angular and linear displacements of said server arm, said server arm, actuating mechanism and gripping device constituting a transfer device, a first supporting surface adapted to carry a storage pile of records disposed outside the periphery of the turntable, a second supporting surface adapted to carry a stosking pile of played records disposed outside of the periphery of the turntable below the said first supporting surface, said transfer device bringing each record of said storage pile carried by said first supporting surface on to the said turntable, then after the hearing, transferring the said record on the stocking pile carried by said second supporting surface, a centering device carried by said first supporting surface for the records of the storage pile comprising fingers passing through the stored records by their central hole, said fingers being movable radially between two stable positions in which the said centering fingers are disposed on circumferences of diameters corresponding to the diameter of the central hole of records of 0.275 in. and 1.26 in. respectively.

8. In an automatic record changer, in which each record to be played is brought from a storage position to a playing position, then, after the hearing of the record has ended, moved from its playing position to a stocking position for played records, including a frame, a motor, a turntable drivingly connected to said motor, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed on the smaller diameter having a greater length than the noses of the said other pair of noses, actuating means of said gripping device said actuating means being unaffected by the angular and linear displacements of the said server arm, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device bringing each record of said storage pile carried by said first supporting surface on to the said turntable, then after the hearing, transferring the said record on the stocking pile carried by said second supporting surface, a centering device carried by said first supporting surface for the records of the storage pile comprising centering fingers passing through the stored records by their central hole, said fingers beign movable radially between two stable positions in which the said centering fingers are disposed on circumferences of diameter corresponding to the diameter of the central hole of records of 0.275 in. and 1.26 in. respectively, a centering device carried by the turntable comprising a retractable centering device having a large center movable against the action of a spring, retaining means enabling to secure said large center either in its raised or in its retracted position, as well as a small retractable center, and a spring tending to maintain said small center in its raised position.

9. In an automatic record changer, in which each record to be played is brought from a storage position to a playing position, then, after the hearing of the record has ended, moved from its playing position to a stocking position for played records, including a frame, a motor, a turntable drivingly connected to said motor, a pick-up arm and a cycle control mechanism actuated by the said motor and controlling all the movements of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed on the smaller diameter having a greater length than the noses of the said other pair of noses, actuating means of said gripping device said actuating means being unaffected by the angular and linear displacements of said server arm, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device brining each record of said storage pile carried by said first supporting surface on to the said turntable, then, after the hearing, transferring the said record on the stocking pile carried by said second supporting surface, a centering device carried by said first supporting surface for the records of the storage pile comprising two centering fingers, an element carrying each of said fingers, said elements being movable between two stable angular positions, for which the said centering fingers are disposed on circumferences of diameters corresponding to the diameter of the central hole of records of 0.275 in. and 1.26 in. respectively, stops defining said two stable positions and an elastic member connecting said two elements and maintaining them in either of said two stable positions.

10. In an automatic record changer, in which each record to be played is brought from a storage position to a playing position, then, after the hearing of the record has ended, moved from its playing position to a stocking position for played records, including a frame, a motor, a turntable drivingly conncted to said motor, a pick-up arm and a cycle control mechanism actuating by the said motor and controlling all the movement of the various members of the changer, the combination of a server arm movable angularly and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed on the smaller diameter having a greater lengh than the noses of the said other pair of noses actuating means of said gripping devices said actuating means being unaffected by the angular and linear displacements of said server arm, said server arm, actuating mechanism and gripping device consituting a transfer device, a first supporting surface adapted to carry a storage pile of records disposed outside the periphery of the turntable, a second supporting surface adapted to carry a stocking pile of played records disposed outside of the pheriphery of the turntable below the said first supporting surface, said transfer device bringing each record of said storage pile carried by said first supporting surface on to the said turntable, then, after hearing, transferring the said record on the stocking pile carried by said second supporting surface, a soft brush removably secured to said server arm and entering into contact with the upper surface of a record during its hearing for removing in dust from the same.

11. In an automatic record changer, in which each record to be played is brought from a storage position to a playing position, then, after the hearing of the record has ended, moved from its playing position to a stocking position for played records, including a frame, a motor, a turntable drivingly connected to said motor, a pick-up arm and a cycle control mechanism actuated by the said motor and controlling all the movements of the various members of the changer, the combination of a server arm movable angular and linearly along a vertical axis with respect to said frame, an actuating mechanism for the angular and linear displacements of said server arm and a record gripping device comprising two pairs of noses disposed each on a diameter corresponding respectively to the small and large central holes of records, the said pair of noses disposed on the smaller diameter having a greater length than the noses of the said other pair of noses, a short nose of said inner pair of noses having a cylindrical part and a tapering end, a long nose of said inner pair of noses having also a cylindrical part and presenting at its end an edge situated on a larger diameter than that of the said cylindrical part, actuating means of said gripping device, said actuating means being unaffected by the angular and linear displacements of said server arm, said server arm, actuating mechanism and gripping device constituting a transfer device, a first supporting surface adapted to carry a storage pile of records disposed outside the periphery of the turntable, a second supporting surface adapted to carry a stocking pile of played records disposed outside of the periphery of the turntable below the said first supporting surface, said transfer device bringing each record of said storage pile carried by said first supporting surface on to the said turntable, then, after the hearing, transferring the said record on the stocking pile carried by said second supporting surface, a soft brush removably secured to said server arm and entering into contact with the upper surface of a record during its hearing for removing in dust from the same, a centering device carried by the turntable comprising a retractable centering device having a large center movable against the action of a spring, retaining means enabling to secure said large center either in its raised or in its retracted position, as well as a small retractable center, and a spring tending to maintain said small center in its raised position, a centering device carried by said first supporting surface for the records of the storage pile comprising two centering fingers, an element carrying each of said fingers, said elements being movable between two stable angular positions, for which the said centering fingers are disposed on circumferences of diameters corresponding to the diameter of the central hole of records of 0.275 in. and 1.26 in. respectively, stops defining said two stable positions and an elastic member connecting said two elements and maintaining them in either of said two stable positions.

References Cited by the Examiner

UNITED STATES PATENTS 1,460,940 7/1923 Brosius .............. 274—10

FOREIGN PATENTS 333,617 8/1930 Great Britain.

NORTON ANSHER, *Primary Examiner.*

WILLIAM E. JACKSON, *Assistant Examiner.*